July 8, 1958      O. H. BANKER      2,842,239

DOUBLE PEDAL ARRANGEMENT FOR AUTOMOTIVE VEHICLE BRAKES

Filed May 5, 1954      2 Sheets-Sheet 1

INVENTOR.
Oscar H. Banker
BY
Charles P. Vrytech
Att'y

July 8, 1958
O. H. BANKER
2,842,239
DOUBLE PEDAL ARRANGEMENT FOR AUTOMOTIVE VEHICLE BRAKES
Filed May 5, 1954
2 Sheets-Sheet 2
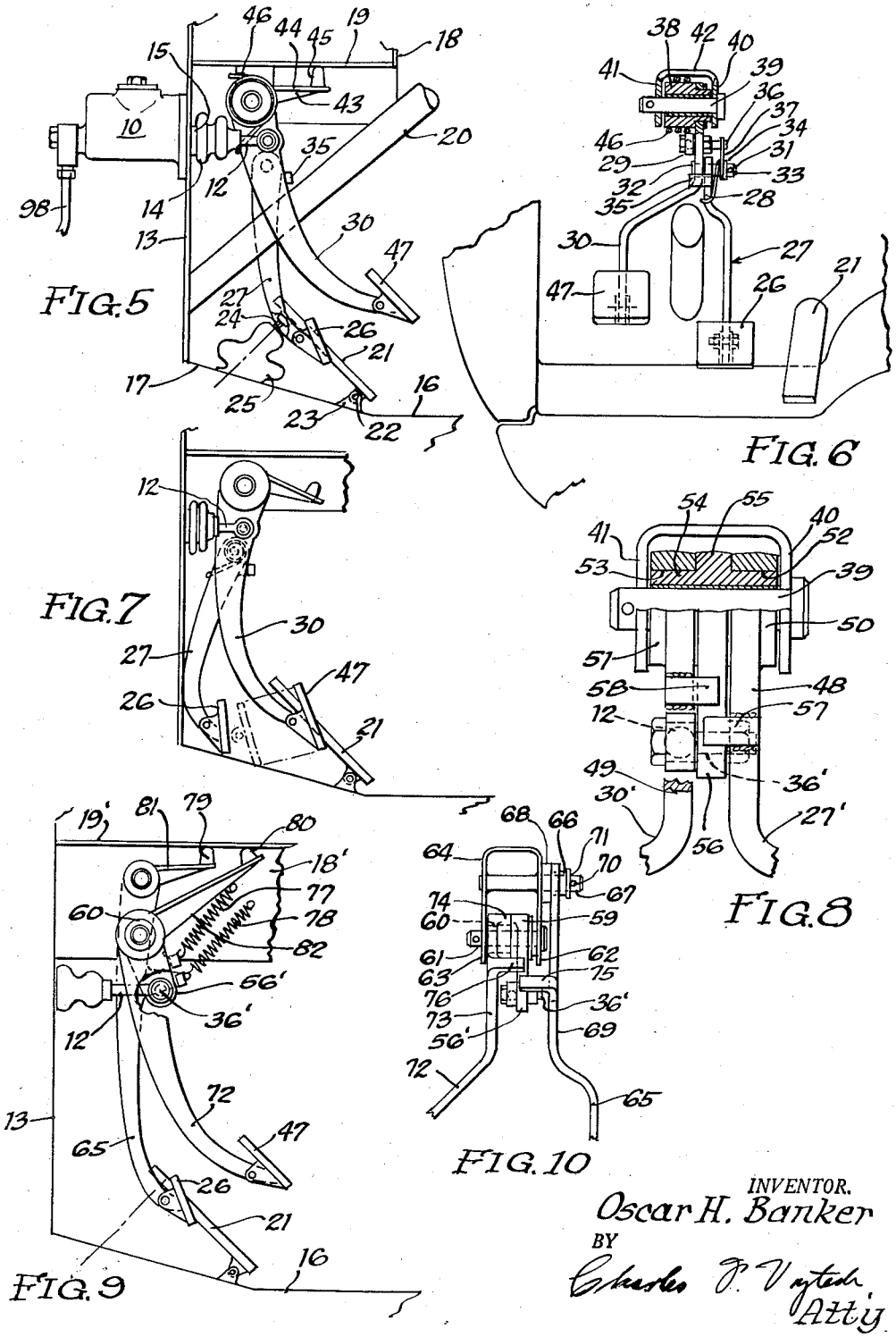
INVENTOR.
Oscar H. Banker
BY
Charles P. Vajtech
Atty

United States Patent Office 2,842,239
Patented July 8, 1958

2,842,239

DOUBLE PEDAL ARRANGEMENT FOR AUTOMOTIVE VEHICLE BRAKES

Oscar H. Banker, Evanston, Ill., assignor to New Products Corporation, Chicago, Ill., a corporation of Delaware Application May 5, 1954, Serial No. 427,830

7 Claims. (Cl. 192—3)

This invention relates to a dual pedal arrangement for operating the brakes of an automotive vehicle.

Many automobile vehicles, particularly passenger automobiles, are presently equipped with power-operated means for applying the brakes of the vehicle. The specific means used in each instance to apply the power to the brakes varies, but in most cases it is so designed that should the power fail, the brakes may be applied mechanically by a continued movement of the brake pedal in the brake applying direction. Although this emergency mechanical opeartion is available in such brakes in theory, in practice the availability is limited and in some cases destroyed by other factors. For example, it is traditionally customary to have the brake pedal disposed adjacent the accelerator pedal so that both pedals may be operated by the same foot of the driver. Since a power brake does not require very much pressure for its application, automobile designers have endeavored to dispose the brake pedal adjacent the accelerator pedal in such a way that the operator may depress either the accelerator pedal or the brake pedal by pivoting upon his heel as it rests upon the floor board of the vehicle. Such operation reduces still further the fatigue of raising the entire leg of the operator from one pedal as it is transferred to the other pedal.

The valve which controls the application of power to the brakes is designed to have a specified linear travel. The pedal which operates the valve is preferably made to have a 7 to 1 ratio, that is, the pedal moves seven times the distance that the valve moves. The desired location of the pedal relative to the accelerator pedal for easy operation by a pivoting action of the operator's foot makes necessary a change in the fulcrum point for the pedal, which results in a lower mechanical advantage for the operator's foot in order to secure the same linear movement of the brake control valve. In the event that power fails, however, the operator finds that the mechanical application of the brakes requires substantially twice the amount of foot pressure as is required by the ordinary hydraulic brakes and possibly more, depending upon the construction of the power unit and whether the piston of the unit must be dragged along with the mechanical operation of the brakes. Under these conditions the driver may suddenly find himself without the necessary physical strength for applying the brakes of the vehicle and then must resort to whatever other means remain at his disposal for stopping the vehicle. In many cases, the vehicle can be stopped only by running it into an embankment or other relatively fixed abutment, with the attendant risk of damage to the vehicle and injury to the driver.

It may also happen in a pedal control for a brake, whether power operated or not, that the brake bands have become worn to the point where a large part of the pedal travel is used to take up the slack in the bands, with the result that the brake pedal, if located beside the accelerator pedal and having therefore a limited range of movement, may not have sufficient movement left to apply the brakes hard in an emergency.

The principal object of this invention is the provision, in an automotive vehicle equipped with a brake control, of brake pedal means for operating the control which satisfies all of the requirements for a desirable operation of the pedal means for the brakes in conjunction with the accelerator pedal for the vehicle, and yet leaves the driver with ample mechanical advantage and residual movement for applying the vehicle brakes in the event of an emergency.

A more specific object of this invention is the provision of dual operating means for the control member of a brake system for an automotive vehicle capable of application by power or by manual effort, one of said control means being used to control the power operated device for operating the brake means under normal conditions and the other being adapted to continue movement of the control member for the brake system after the first-mentioned control means has been moved as far as it can go in a brake applying direction to effect a manual operation of the brakes.

A still more specific object of this invention is to provide, in a power operated brake system for automotive vehicles, a pair of brake levers for operating a single control member for the brake system, one lever being disposed at the optimum position relative to the accelerator pedal for the vehicle and the other being laterally and angularly displaced from the first pedal and being adapted to swing through a greater arc than the said first pedal.

A feature of this invention is a design of dual pedal control for a vehicle brake wherein both pedals are adapted to operate the same brake control member, but each pedal has a different mechanical advantage for the application of pressure to the control member.

These and other objects and features of this invention will become apparent from the following detailed description when taken together with the accompanying drawings in which:

Fig. 5 is a fragmentary side elevational view of the driving compartment of an automotive vehicle showing a typical accelerator pedal and brake control installation, with the dual pedal control of this invention applied thereto;

Fig. 6 is a fragmentary front elevational view of that portion of the driving compartment of an automotive vehicle which is depicted in Fig. 5;

Fig. 7 is a side elevational view corresponding to that of Fig. 5 showing the brake pedals in maximum power operating position;

Fig. 8 is an enlarged fragmentary front elevational view of a modification of the connections between the dual brake pedals and the brake control member;

Fig. 9 is a fragmentary side elevational view of a driver's compartment showing a further modification of the dual brake levers; and Fig. 10 is an enlarged front elevational view of the upper portion of the dual brake levers of Fig. 9.

Figure 1:
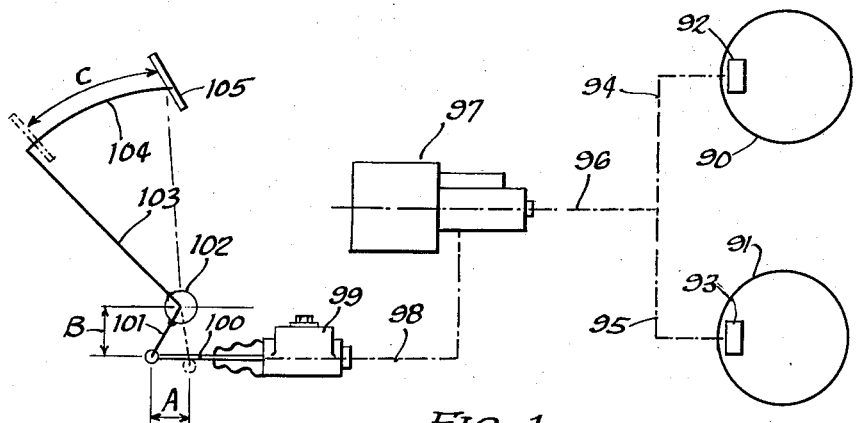
Fig. 1 is a schematic diagram of a typical power operated vehicle brake system and foot pedal control therefor.

Referring now to the schematic diagram of Fig. 1, a conventional vehicle brake system is comprised of wheel brake drums 90, 91 having hydraulic brake cylinders 92, 93 for applying the brake shoes (not shown) to the drums to arrest the rotation of the vehicle wheels. Cylinders 92, 93 are connected by suitable pipe or hose 94, 95, 96 to a power device 97, the function of which is to augment the pressure produced in the system by the driver of the vehicle to reduce the effort required of the driver to apply the brakes. The present invention is designed to operate with any of the well known power brake systems and hence the details of the power device 97 will not be described herein in detail. A control pressure is supplied to power device 97 through a pipe or hose 98 from a master cylinder 99 having an axially reciprocable control rod 100 extending outwardly from cylinder 99. It is contemplated that the brakes 90, 91 will be applied upon movement of control rod 100 to the right as viewed in Fig. 1.

Rod 100 is connected to one arm 101 of a bell crank pivoted to the vehicle frame at 102, the other arm 103 of said bell crank having an arcuate extension 104 which passes through a suitable opening in the floor boards of a vehicle into the driver's compartment thereof. The upper end of extension 104 is surmounted by a pedal 105 adapted to be contacted by the vehicle operator's foot. The relative lengths of the arms in the Fig. 1 form are such that for a maximum travel of rod 100 through a distance A, pedal 105 will travel through an arc C which is the normal travel of a brake pedal, whether manually or power operated, from fully released to the lowest possible fully engaged positions.

Figure 2:
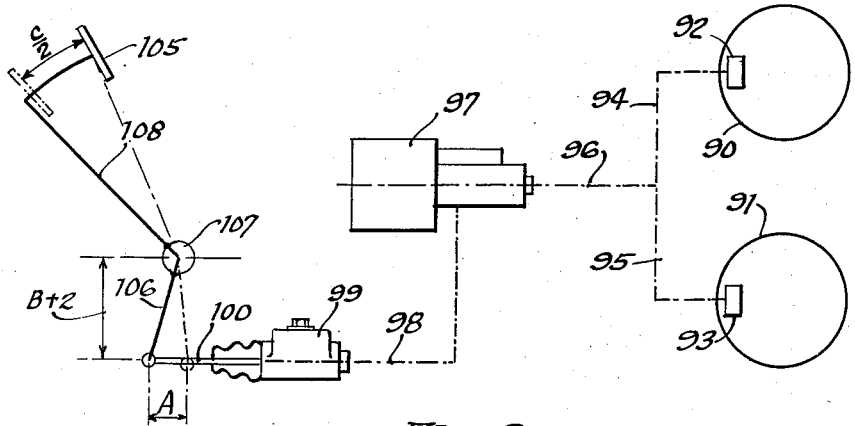
Fig. 2 is a schematic diagram of the system of Fig. 1 with the pedal modified to have a lower mechanical advantage and hence a shorter travel than the pedal of Fig. 1.

Due to the low pedal pressure required when a power device is used to augment the pedal pressure, some designers have sought to reduce the travel of the pedal 105 by changing the ratio of the arms 101 and 103 so that the maximum travel A of the control rod 100 remains the same with a lesser travel of pedal 105. A design of this type is shown in Fig. 2, wherein rod 100 is connected to an arm 106 of a bell crank pivoted to the vehicle frame at 107 and having its other arm 108 secured to an extension 109 to the upper end of which pedal 105 is secured. It may be noted that whereas the effective length of arm 101 at the brake released position of rod 100 is represented by the line B, the effective length of arm 106 under the same conditions is twice that of B and hence the travel of pedal 105 in Fig. 2 is one-half the travel C of pedal 105 in Fig. 1. Consequently, in the event of a power failure, twice the normal manual brake pedal pressure would be required in the Fig. 2 arrangement to produce the same pressure in pipe 98 as is produced by the Fig. 1 arrangement. Bearing in mind the fact that the manual pressure is in any event greater than the pressure under power, the manual pressure required may be more than the vehicle operator can supply and hence he may be unable to stop the vehicle.

Figures 3, 4:
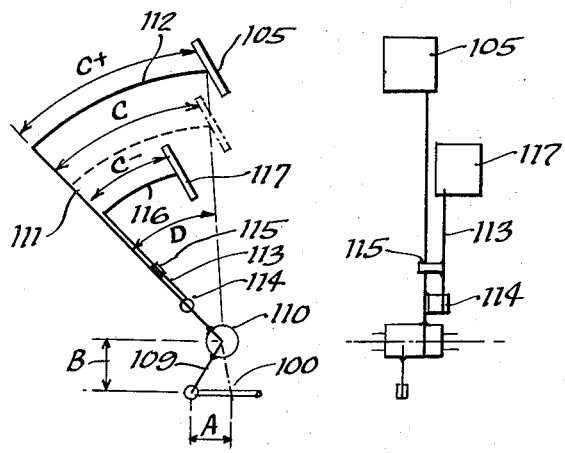
Fig. 3 is a schematic diagram showing a dual pedal control made in accordance with this invention, one of said pedals being shorter than the other and adapted to be disposed beside an accelerator pedal.
Fig. 4 is a schematic front elevation of the pedals of Fig. 3.

A dual pedal arrangement designed to obviate the difficulty encountered in the Fig. 2 design and yet provide the benefits thereof is shown in Fig. 3. In that figure is depicted a bell crank having an arm 109 secured to rod 100 and having an effective initial length B as in the Fig. 1 design. The bell crank is pivoted to the vehicle frame at 110 and has an arm 111 extending beneath the floor boards of the vehicle (not shown). An arcuate extension 112 mounted on the end of arm 111 passes through the floor boards and into the operator's compartment. A pedal 105 is mounted on the upper end of extension 112. A second arm 113 pivotally mounted at 114 on arm 111 has a stop 115 extending into the path of movement of arm 111. An arcuate extension 116 also passes into the operator's compartment through the floor boards and has a pedal 117 mounted on the upper end thereof.

It may be noted that arm 113 is shorter than arm 103 of Fig. 1 and arm 111 is longer than arm 103. It is contemplated that pedal 117 will be used while the power device 97 is effective and the brake shoes are properly adjusted to provide a minimum of slackness. Under these conditions, using the same effective length of arm 109 as in Fig. 1, pedal 117 and arm 111 contacted by stop 115 will move together through a smaller arc than pedal 105 of Fig. 1 and, depending upon the length of arm 113, can be made to travel the short distance of pedal 105 of Fig. 2. In the event of a power failure, or an undue looseness of the brake shoes, such that pedal 117 either cannot be moved because of the excessive pressure required, or moves to the point where it contacts the floor boards and still is ineffective to apply the brakes the desired amount, the operator can quickly reach upward and depress pedal 105 on extension 112. Since arm 111 is longer than arm 103, ample mechanical advantage is available to take care of a lack of power, and ample unused travel is available to continue to apply and increase brake pressure in the event power is available but the brakes are too loose.

Thus in the Fig. 3 design, pedal 117 may be disposed adjacent the accelerator pedal for convenience in shifting from the accelerator pedal to the brake pedal while pedal 105, being some distance above pedal 117, is out of the way, but available if needed.

The principle of dual pedal operation described with reference to Fig. 3 may be applied with equal facility to the form of pedal actuated arm which is pivoted to some point on the frame or body of the vehicle located inside the driver's compartment and above the pedals themselves. These forms are shown in Figs. 5 to 10 inclusive.

In Figs. 5 and 6, there is shown in outline a master cylinder 10 of a hydraulic brake system for applying braking effort to the wheels of an automotive vehicle (not shown) the master cylinder being of any standard and well known construction. Said cylinder is connected through suitable pipe 98 to a power device such as 97 (Fig. 1) or to the individual brakes on the vehicle. The control member for the master cylinder is shown at 12 and is comprised of a rod which is reciprocable axially relative to cylinder 10 from a position such as that shown in Fig. 5 corresponding to a brake releasing condition of master cylinder 10, to a position to the left of the one shown, wherein said control member 12 is advanced into master cylinder 10 to positions corresponding to various brake applying conditions in said cylinder 10.

Master cylinder 10 is secured to one side of the fire wall 13 defining the forward portion of the driver's compartment for the vehicle, and rod 12 extends through said fire wall into the said driver's compartment. A flexible rubber boot 14 seals the rod 12 relative to master cylinder 10, said master cylinder being provided with a short boss 15 which likewise extends into the driver's compartment and to which boot 14 is sealed.

Said driver's compartment is also defined by the floor boards 16 of the vehicle, the generally horizontally disposed surface of which is broken by the angularly disposed toe board 17 which connects the floor board 16 with fire wall 13. The upper regions of the driver's compartment are defined in part by a vertically disposed cowl 18 which connects with a horizontally extending portion 19 thereof of relatively rigid construction. A steering column 20 projects angularly upwardly through fire wall 13 and under cowl 18. An accelerator pedal 21 is pivoted at 22 to a bracket 23 mounted on toe board 17, the forward or upper end of accelerator pedal 21 being connected through a link 24 to the throttle of the vehicle engine (not shown). A flexible boot 25 seals link 24 relative to toe board 17 to prevent dust, etc. from entering the driver's compartment through the opening around link 24.

Disposed adjacent accelerator pedal 21 is a brake operating pedal 26 which it is contemplated will normally be used to operate master cylinder 10. To this end, pedal 26 is secured to an arm 27 having a lateral offset at 28 which is parallel to an offset 29 on a second level 30 having a pedal 47 on the lower end thereof. The offsets 28 and 29 permit the disposition of the lower ends of levers 27 and 30 on opposite sides of steering column 20 and also insure a sufficient separation of the pedals 26 and 47 to permit independent operation thereof without interference from one another.

Offset 28 is secured to offset 29 by a pin 31 which passes through both offsets and has a head 32 abutting offset 29, the opposite end of pin 31 having a cotter pin or the like 33 and a washer 34 for retaining pin 31 in assembled relation relative to said offsets 28 and 29. Offset 28 is loose on pin 31 and hence is freely rotatable thereabout. Its movement relative to offset 29 is limited, however, by a transversely disposed stop 35 which is preferably formed integrally with lever 27 and extends into the path of movement of offset 29 of lever 30.

The free end of operating rod 12 is secured by a shoulder pin 36 to offset 29, said end of rod 12, however, being free to rotate about pin 36. A torsion spring 37 having one end engaging pin 36 and the other end hooked around offset 28 constantly biases lever 27 in a clockwise direction, as viewed in Fig. 5, relative to lever 30 so as to maintain stop 35 continuously in contact with the edge of offset 29 and thereby to prevent rattling of lever 27.

Offset 29 is welded or otherwise secured to a spool 38 which is free to rotate on a pin 39 passing through suitable openings in the arms 40 and 41 of the U-shaped hanger 42. Said hanger 42 is rigidly secured to the horizontal portion 19 of cowl 18.

Offset 29 is formed with a stop 43 extending to the right of pin 39 as viewed in Fig. 5 and having a transversely disposed flange 44 defining the upper edge thereof. Secured to flange 44 is a rubber stop member 45 which is adapted to contact the underside of horizontal portion 19 of cowl 18. A torsion spring 46 wrapped around spool 38 has one end hooked around the back edge of offset 29 and the other end abutting on hanger 42, and is so tensioned as to cause offset 29 and its associated lever 30 to have counterclockwise movement corresponding to a releasing movement of control rod 12.

It may be observed from the description thus far given that pedal 47 is constrained to move with pedal 26 by virtue of the stop member 35 contacting the edge of lever 30 so that when it is desired to apply the brakes of the vehicle, the driver merely removes his foot from accelerator pedal 21 and applies it to pedal 26, which he then pushes forward or to the left as viewed in Fig. 5 until the desired braking action is secured. The forward movement of pedal 26 causes lever 27 to move lever 30 in the same direction about pin 39, and this action results in a movement of control rod 12 into master cylinder 10 to perform its appropriate control action on the fluid within said cylinder 10.

As in the schematic form shown in Fig. 3, the Fig. 5 form of dual pedal provides a pedal which has the mechanical advantage necessary for a successful mechanical operation of the brakes in the event of a power failure, and a second pedal which has a shorter linear travel, comparable to that of an accelerator pedal so that it may be used when power is available to operate the brakes and the brakes are properly adjusted.

In the event that the brake shoes have become worn and loose such that insufficient braking effort is supplied by the vehicle brakes even when pedal 26 is pushed forward to the limit of its movement in that direction, i. e. when lever 27 strikes fire wall 13, the operator of the vehicle will find the pedals 26 and 47 substantially in the position shown in Fig. 7. In this position, although both pedals have travelled through identical arcs, pedal 47 is still some distance from the floor and wall 13 whereas pedal 26 is immediately adjacent the floor and lever 27 abuts on fire wall 13. Thus, although further movement in a brake applying direction is impossible in lever 27, the operator may nevertheless continue the movement of control rod 12 by depressing pedal 47 with his left foot. The residual movement in pedal 47 is substantially equal to or greater than the residual movement in rod 12 so that substantially at or before the limit of movement of pedal 47 in the brake applying direction, rod 12 reaches the limit of its travel in that direction.

The operator thus is enabled to handle emergency situations which otherwise he would be completely unable to master. At the same time, the convenience of having a brake applying pedal at substantially the same level of the accelerator pedal has not been sacrificed or diminished in any degree. Although pedal 47 follows the movement of pedal 26, said pedal 47 is some distance removed, both laterally and vertically, from pedal 26 and hence does not interfere with the normal movement of the brake pedal 26.

In the event that an automobile manufacturer would find the conjoint movement of pedals 47 and 26 undesirable, the form shown in Fig. 8 may be used. In this form the pedals are independent of one another, that is to say, levers 27 and 30 are not pivoted one upon the other, but are pivoted upon a common spool. Thus, lever 27' has an offset 48 and lever 30' has an offset 49, offsets 48 and 49 being spaced apart. The offsets 48 and 49 are formed with terminal bosses 50 and 51, respectively, each having an opening 52 and 53, respectively. The levers are slipped over the opposite ends of a spool 54 through openings 52 and 53, the spool 54 being mounted for free rotation about pin 39. Said spool 54 has a cenrtal radially disposed flange 55 which terminates in a downwardly and forwardly depending arm 56, which is connected by a shoulder pin 36' to rod 12 as in the Fig. 1 and 2 modification. Said arm 56 thus is disposed between offsets 48 and 49.

Offset 48 has a stop 57 extending transversely thereof and into the path of movement of arm 56, and similarly offset 49 has a stop 58 extending transversely thereof and into the path of movement of arm 56.

It may be observed that in the Fig. 8 modification, either offset portion 48 or 49 may be moved entirely independently of the other to actuate arm 56 through stops 57 and 58 and thereby to apply the brakes through rod 12. As in the Fig. 5 modification, each pedal will be at a different elevation from the floor boards, the pedal associated with lever 30' being at a greater elevation than the pedal associated with lever 27' so that pedal 47 will normally be out of the way but available for extra brake applying effort when needed. Also, after pedal 26 has gone as far as it is possible to move it, pedal 47 will be capable of further movement to insure a complete operation of the brakes.

Inasmuch as the manual operation of the brakes is contemplated to be an emergency operation and hence seldom used, the amount of effort which must be applied by the operator to the rod 12, even under the present advantageous arrangement of pedals, may be somewhat higher than in a vehicle equipped with purely manually operable brakes. The change, therefore, from the "power" brake pedal to the "manual" brake pedal may require the application of an unaccustomed amount of pressure which the operator may find disturbing. For this reason it may be desirable to utilize a greater mechanical advantage for the "manual" brake pedal than for the "power" brake pedal. Such a construction is shown in Figs. 9 and 10 reference to which is now made.

The Figs. 9 and 10 modification requires independent operation of levers 27 and 30 and hence the same construction for a brake applying arm may be used as in the Figs. 7 and 8 form modified, however, as to the pivoted support therefor since the former support provides a pivot for but one of the levers. Thus, rod 12 is connected through shoulder pin 36' to an arm 56' which extends radially outwardly from a flange 59 formed at one end of a spool 60. Said spool 60 is mounted for rotation about a pin 61 passing through suitable openings in the end regions of the arms 62 and 63 of a U-shaped bracket 64 fixed to the horizontal portion 19' of the cowl of the driver's compartment.

Pedal 26 is secured to a lever 65 which extends upwardly along arm 62 of bracket 64 and has a terminal boss 66 through which passes a pin 67 welded or otherwise secured to arms 62 and 63 of bracket 64. A spacer washer 68 insures a proper clearance between the right-hand end of pin 61 as viewed in Fig. 6 and the offset 69 of lever 65. Suitable means, such as a cotter pin 70 and a retaining washer 71, may be used to retain terminal boss 66 on pin 67.

Pedal 47 is secured to a lever 72 having an offset 73 spaced from offset 69, said offset 73 having a terminal boss 74 pivotally mounted on spool 60.

Offset 69 has a stop 75 extending transversely thereof and into the path of movement of arm 56' and, similarly, offset 73 has a stop 76 extending transversely thereof into the path of movement of arm 56'. Suitable tension springs 77 and 78 may be extended between fixed abutments on the cowl 18' and stops 76 and 75 to urge said levers 72 and 65 respectively to their brake releasing positions. The action of the springs 77 and 78 may be limited by rubber stop members 79 and 80 secured to arms 81 and 82 extending laterally from levers 65 and 72 respectively.

To apply the brake in the Figs. 9 and 10 modification, pressure is applied to pedal 26 as in the preceding modifications, lever 65 pivoting about pin 67 and causing its stop 75 to engage arm 56 to rotate said arm in a clockwise direction as viewed in Fig. 9 and thereby move rod 12 to the left in a brake applying direction. Should there be a power failure, or should lever 65 be moved to the position wherein it abuts fire wall 13 and further braking effort is still required to stop the vehicle, the operator then depresses pedal 47 which, because of its greater elevation from floor board 16 and also its greater distance from fire wall 13, will, at the time lever 65 is located at the limit of its movement, be in a position to continue the movement of arm 56' and rod 12 in a brake applying direction.

It may be noted that due to the difference in the distance from the pivot pins 61 and 67 to shoulder pin 36', different mechanical advantages will be available for the "power" and "manual" application of the brakes, with the latter having the greater mechanical advantage. Obviously, this mechanical advantage can be made greater or lesser as the designer wishes merely by a proper selection of the pivot point relative to rod 12.

It may be apparent from the foregoing description that in any one of the modifications hereinabove described, means are provided for applying the brakes of a vehicle in the event of a power failure or the movement of the power control pedal to the limit of its movement in a power applying direction, the said means requiring only the usual amount of braking effort while at the same time permitting a reduced travel of a brake pedal to permit such pedal to be conveniently placed beside an accelerator pedal.

Although this invention has been described with reference to its application to a vehicle having power means for operating a brake, it is also applicable to a manually operable brake system wherein the full travel of the control element therefor from fully released to fully applied positions is split up between two pedals, one being utilized for light braking pressures and the other for the heavy breaking pressures. It is also applicable wherein the brakes have become worn to the point where a large portion of the brake pedal travel is utilized in taking up the slack in the brakes and consequently not enough travel remains in the normally used pedal to apply the brakes, the second pedal then making available to the driver such additional travel as is necessary for a complete application of the brakes.

It is understood that the foregoing description is merely illustrative of preferred embodiments of this invention and that the scope of the invention therefore is not to be limited thereto but is to be determined by the appended claims:

What is claimed is:

1. In a braking system for a vehicle having an accelerator pedal and a control element for the brake system movable between positions corresponding to brake-released and brake-applied positions and to an emergency position, a pair of levers, a fixed abutment, one of said levers being movable from a position beside the accelerator to the abutment and the other lever being movable from a position above the accelerator pedal to the abutment, such that the other lever has a greater arcuate travel than the said one lever, and means connecting the levers to the control element, the said one lever moving the element from brake-released to brake-applied positions and said other lever moving the element from brake-applied to emergency positions.

2. In a braking system for a vehicle having an accelerator pedal and a control element movable between positions corresponding to a brake-released position and to brake-applied positions corresponding to different brake-applying pressures, a fixed pivot, a pair of levers rotatable about said pivot, an arm rotatable about said pivot, means connecting the arm to the element, means connecting the levers to the arm, a common abutment for both levers when said levers are moved in a brake-applying direction, and abutments for the levers when they are moved in a brake-releasing direction, the abutment in brake-releasing direction for one lever holding that lever alongside the accelerator pedal and the abutment for the other lever holding said other lever in an elevated position relative to the accelerator pedal, such that said other lever is capable of moving the element in a brake-applying direction after the said one lever has reached the common abutment.

3. In a braking system as described in claim 2, said levers being spaced apart, said arm being disposed between the levers, and said means connecting the levers to the arm comprising stops extending traversely from the levers into the path of movement of the arm.

4. In a braking system for a vehicle having an accelerator pedal and a control element movable between positions corresponding to a brake-released position and to brake-applied positions corresponding to different brake-applying pressures, a pair of fixed pivots, a pair of levers, one rotatable about one pivot and the other rotatable about the other pivot, an arm rotatable about said one pivot, means connecting the arm to the control element, means connecting the levers to the arm, the pivots being disposed at different distances from the control element such that different mechanical advantages are provided by the levers, a common abutment for both levers when said levers are moved in a brake-applying direction and abutments for the levers when they are moved in a brake-releasing direction, the abutment in a brake-releasing direction for one lever holding that lever alongside the accelerator pedal and the abutment for the other lever holding said other lever in an elevated position relative to the accelerator pedal such that said other lever is capable of moving the element in a brake-applying direction after said one lever has reached the common abutment.

5. In an automotive vehicle having a driver's compartment including a cowl, a fire wall, a toe board and a floor board, an accelerator pedal disposed on the toe board, a bracket depending from the cowl, a brake-controlling element extending from the fire wall into the compartment, a lever pivotally mounted on said bracket and extending downward to a position above and behind the accelerator pedal, a second lever pivotally mounted on the first lever and extending downward into proximity to and alongside of the accelerator pedal such that the driver of the vehicle may contact either the accelerator pedal or the lever pivotally mounted on the first lever by pivoting his heel on the floor board, means connecting the second lever to the brake-controlling element so that the said element is movable therewith, and means constraining the first lever to move with the second lever until the second lever reaches the fire wall, said constraining means being releasable to permit the first lever to continue to move toward the fire wall while the second lever substantially ceases to move in that direction.

6. A braking system for a vehicle having an accelerator pedal, a control element for the braking system movable from a position corresponding to a brake released position to a plurality of positions corresponding to progressively increased brake applying pressures, a pair of levers, the free end of one lever being disposed adjacent the free end of the accelerator pedal and movable through substantially the same angular distance as the free end of the accelerator pedal and the other lever being removed from the accelerator pedal with its free end movable through an angular distance greater than the angular distance through which the free end of the accelerator pedal moves, and means for connecting the levers to the brake control element, said connecting means including means for pivoting the first-mentioned lever on the said other lever, and means for compelling the said other lever to move with the first-mentioned lever, whereby to move said element from its brake released position to any one of the said plurality of positions by the application of pressure to the free ends of either one of the pair of levers.

7. A braking system as described in claim 6, the means for compelling the said other lever to move with the first-mentioned lever comprising a stop extending from the first-mentioned lever across the said other lever and in contact therewith, and resilient means for continuously urging the stop against the said other lever.

References Cited in the file of this patent

UNITED STATES PATENTS

| 1,553,647 | Thomas | Sept. 15, 1925 |
| 1,657,738 | Booth | Jan. 31, 1928 |
| 2,302,436 | Felton | Nov. 17, 1942 |

FOREIGN PATENTS

| 639,977 | France | Mar. 19, 1928 |